(12) United States Patent
Berthaud et al.

(10) Patent No.: US 6,618,811 B1
(45) Date of Patent: Sep. 9, 2003

(54) METHOD OF AUTOMATICALLY DETERMINING WHETHER POWER CONSUMPTION DEVICES CAN BE POWERED UP IN A POWER CONSUMING SYSTEM

(75) Inventors: Jean-Marc Berthaud, Villeneuve Loubet (FR); Jean-Francois Fauh, Cagnes s/Mer (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/621,395

(22) Filed: Jul. 21, 2000

(30) Foreign Application Priority Data

Jul. 29, 1999 (EP) .............................................. 99480066

(51) Int. Cl.$^7$ .............................. G06F 1/26; G06F 1/28

(52) U.S. Cl. ..................... 713/300; 713/324; 713/340

(58) Field of Search ................... 713/300, 324, 713/340

(56) References Cited

U.S. PATENT DOCUMENTS

| | | | | |
|---|---|---|---|---|
| 5,339,445 | A | * | 8/1994 | Gasztonyi ................... 713/324 |
| 5,673,420 | A | * | 9/1997 | Reyes et al. ................. 395/500 |
| 5,752,046 | A | * | 5/1998 | Oprescu et al. ............. 713/300 |
| 5,842,027 | A | * | 11/1998 | Oprescu et al. ............. 713/300 |
| 5,940,779 | A | * | 8/1999 | Gaitonde et al. ............. 702/60 |
| 5,964,879 | A | * | 10/1999 | Dunstan et al. ............. 713/340 |
| 6,134,666 | A | * | 10/2000 | De Nicolo ................... 713/300 |
| 6,363,515 | B1 | * | 3/2002 | Rajgopal et al. ................ 716/5 |

FOREIGN PATENT DOCUMENTS

| | | | |
|---|---|---|---|
| DE | 003340804 | A1 * | 5/1984 |
| WO | WO 96/19764 | | 6/1996 |

OTHER PUBLICATIONS

Devadas et al., "Estimation of Power Dissipation in CMOS Combinational Circuits Using Boolean Function Manipulation", IEEE Transaction on Computer–Aided Design, vol. 11, No. 3 Mar. 1992, pp. 373–383.*
Nemani et al., "High–Level Power Estimation and the Area Complexity of Boolean Functions", 1996, pp. 329–334.*
"Application Participation in a Power Management System Having Variable Power States", IBM TDB, vol. 40, Oct. 1997, pp. 197–202.*

* cited by examiner

Primary Examiner—Thomas Lee
Assistant Examiner—Chun Cao
(74) Attorney, Agent, or Firm—John D. Flynn; Daniel E. McConnell; Bracewell & Patterson, LLP

(57) ABSTRACT

A method for automatically determining whether power consumption devices can be powered up in a power consuming system having multiple power consumption devices to be powered up by one or several voltages among a set of voltages V1, V2 . . . Vm. The set of voltages are provided by multiple power supplies, wherein each power supply provides at least one voltage. The power consuming system also includes a control point for controlling the power supplied to the power consumption devices. The method includes determining a set of linear inequations linking each variable $P_{V_1}$, $P_{V_2}$ . . . $P_{V_m}$ representing the power being consumed for each voltage, or combinations of several variables, to predetermined power limits PVC. Next, the real power value (P) requested for each voltage in order to power up each one of the first plurality of power consumption devices is determined. Subsequently, each real power value is divided by the number of power supplies (p) providing power for the associated voltage in order to determine the components of a power consumption vector (PC) for each power supply. Next, the variables $P_{V_1}$, $P_{V_2}$ . . . $P_{V_m}$ are replaced in the inequations by the corresponding components of the power consumption vector for each power supply (PC) in order to obtain a requested power value for each inequation. The requested power value is then compared to the predetermined power limits (PVC). If the requested power values are all less than the predetermined power limits, the power consumption devices can be all powered.

13 Claims, 4 Drawing Sheets

METHOD OF AUTOMATICALLY DETERMINING WHETHER POWER CONSUMPTION DEVICES CAN BE POWERED UP IN A POWER CONSUMING SYSTEM

CROSS-REFERENCE TO RELATED APPLICATION

The present application is related to co-pending U.S. application Ser. No. 09/621,402, filed on even date herewith and incorporated herein by reference.

BACKGROUND OF THE INVENTION

1. Technical Field

The invention relates to systems having hot-pluggable power consumption devices, hot-pluggable power supplies including a non-volatile memory storing their own characteristics and a power management unit providing the optimal power distribution to the power consumption devices as a function of the present power supplies. More particularly, the present invention relates to a method of automatically determining whether one or several power consumption devices can be powered up in a power consuming system.

2. Background

The system involved in the invention can be either a device used in telecommunication networks, such as a router or switching device, or a data processing device that includes a plurality of processors wherein one of the processors acts as a control processor managing the power consumption of the other processors.

Such a system as illustrated in FIG. 1 includes the following components.

(i) a set of power supplies 10, 12, 14 that may be of different types, supplying some or all of the various voltages required by the system (e.g. +3.3V, +5V, −48V, and +12V from 220V AC), and that can be inserted in or removed from the system at any time, (ii) slots that can receive power consumption devices 16, 18, 20 which can be added or removed at any time, (iii) a Control Point 22, provided with a CPU and some memory, capable of reading information that comes from serial EEPROMs over an 12C serial bus 24 connecting the power supplies and the power consumption devices to the Control Point, and controlling the supply of power to the slots, and thus to the devices they contain, the Control Point being permanently powered, and (iv) a power supply distribution network of the various voltages to the Control Point and to the slots, including the capability for the Control Point to control slot powering.

Additionally, the Control Point can access the required power information for any device and any voltage, either through an EEPROM located in the consumption device that contains this information, or through software tables that give this information based on the identification of the inserted device. The Control Point further has an operator interface means such as a console 26.

The design and manufacturing cost of power supplies in the system is an important factor, because savings can be accomplished there. This is why a power supply is not designed straight away to withstand the maximum theoretical load of a system filled with the power consumption devices that have the highest power requirements, but rather to provide the ability to increase the system capability as its power requirements get higher. This way, the cost of small configurations remains competitive compared with their competitors.

The Control Point must, among other things, manage the feeding of slots and devices inserted into them based on the following parameters:

(a) consumption characteristics of power consumption devices, (b) power priority assigned to the power consumption devices in case of a conflict, (c) capability of power supplies to withstand the load required by the Control Point and by the power consumption devices inserted into the slots, and (d) power redundancy if this one is desired for power supplies (i.e. should any of the power supplies fail, remaining power supplies will still withstand the load).

A conflict occurs when the system power supplies cannot withstand the overall load of the devices, because either there are too many devices compared with power supplies capability, or because one or several power supplies failed or were removed. In such a case, the Control Point switches off the devices having the lowest power priority, in order to meet each power supply capability and operating range.

The Control Point can use the console for showing devices not powered in case of a conflict, and requesting that an operator should either add one or more power supplies or remove these devices. The Control Point may also utilize the console for displaying the current redundancy status (i.e. whether redundancy still exists, further to a power supply failure or removal) and for displaying the remaining margin for feeding additional devices when there is no conflicts, so that the operator can decide whether he must plan the addition of one or several power supplies when he wants to add other devices.

Prior art solutions for performing the above tasks are based on:

1. either accessing a description of power maximum capability characteristics for any voltage powered by a power supply, or 2. a feedback mechanism from any power supply to the Control Point, enabling to determine the limit and the remaining margin (see, e.g., PCT application WO 96/19764).

Type 1 solutions have the following disadvantages:

(a) They impose constraints on power supplies design and manufacturing, requiring that the supplied voltages be independent. That is, the power used from a voltage does not affect the amount of power that remains available to another voltage. This kind of constraints substantially increases power supplies design and manufacturing costs, or (b) they do not-require any independence among voltages. However, in such a case, either the Control Point software features remain basic and do not get the most of the power supplies. For example, as it requires more power supplies than needed, the control point software cannot accurately estimate the remaining capability. Thus, it cannot enable an optimum redundancy operation within a system provided with different types of power supplies. This increases the overall cost of the system as the latter requires more power supplies than needed, or (c) the Control Point software can manage optimally the different types of power supplies, but need to know each type. This results in a complexity that increases with the number of types to be managed. This, in turn, increases the testing costs of the system, along with maintenance costs if bugs occur that, in turn, increases directly or indirectly the system overall cost.

Additionally, when creating a new type of power supply (further to a technology improvement, a cost reduction action, or a system evolution), the Control Point software must be updated and the new release must be dispatched that, in turn, also involves additional costs.

Type 2 solutions are not satisfactory either, as they require some intelligence either in the power supplies or around them in the system, that generates a cost equal to or greater than the cost of type 1 solutions.

SUMMARY OF THE INVENTION

It is therefore an object of the present invention to provide an improved power managing system.

It is another object of the present invention to provide a method for automatically and optimally determining whether a power consumption device can be powered up in a power consumption system.

To achieve the foregoing objects, and in accordance with the invention as embodied and broadly described herein a method for automatically determining whether power consumption devices can be powered up in a power consuming system having multiple power consumption devices to be powered up by one or several voltages among a set of voltages V1,V2 ... Vm is disclosed. The set of voltages are provided by multiple power supplies, wherein each power supply provides at least one voltage. The power consuming system also includes a control point for controlling the power supplied to the power consumption devices. The method includes determining a set of linear inequations linking each variable $P_{V1}$, $P_{V2}$ ... $P_{Vm}$ representing the power being consumed for each voltage, or combinations of several variables, to predetermined power limits PVC. Next, the real power value (P) requested for each voltage in order to power up each one of the first plurality of power consumption devices is determined. Subsequently, each real power value is divided by the number of power supplies (p) providing power for the associated voltage in order to determine the components of a power consumption vector (PC) for each power supply. Next, the variables $P_{V1}$, $P_{V2}$ ... $P_{Vm}$ are replaced in the inequations by the corresponding components of the power consumption vector for each power supply (PC) in order to obtain a requested power value for each inequation. The requested power value is then compared to the predetermined power limits (PVC). If the requested power values are all less than the predetermined power limits, the power consumption devices can be all powered.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE PREFERRED EMBODIMENT

Figure 1:
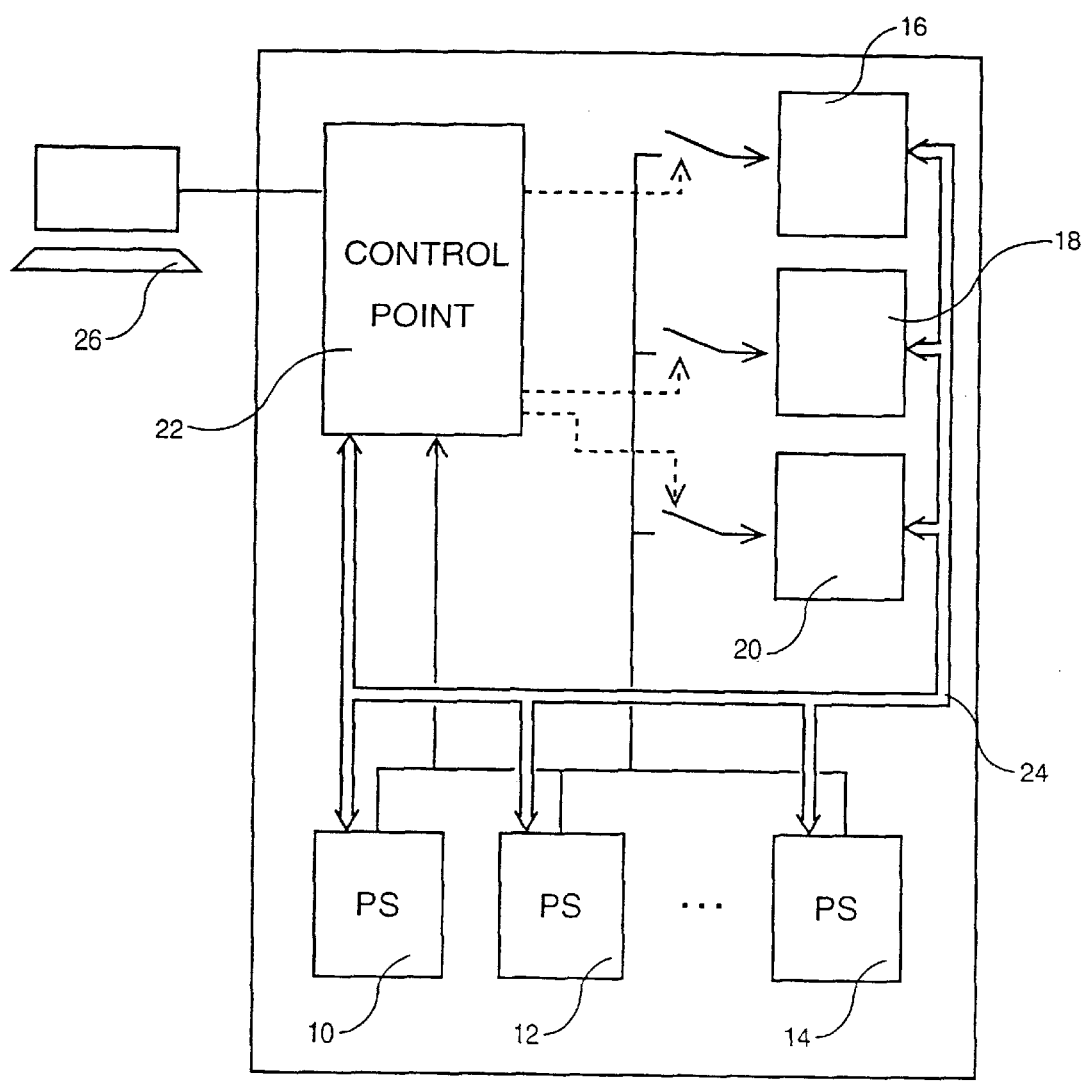
FIG. 1 represents block-diagram of an exemplary system wherein the method according to the invention is implemented.

The method according to the invention is implemented in a system illustrated in FIG. 1 including a first plurality of power consumption devices or modules 16, 18, which are powered up under a set of voltages (3.3 volts, 5 volts, −48 Volts, +12 Volts,) by a second plurality of power supplies 10, 12, 14 under the control of control point unit 22.

Note that, in the following description, it is equivalent to talk about electrical current or power for a given voltage. Power will be used for simplification of the description.

The consumption characteristics of all modules of the system are available in EEPROMs included in each module or through software tables in the control point. It must be noted that the method hereafter disclosed is implemented by a program run in control point unit 22.

The information to be stored and retrieved in each power supply EEPROM are a vector VS of m rows with values equal to 0 or 1, defining which voltage channels are supplied by this power supply, and a matrix PE of n rows and m columns filled with coefficients $\alpha_{ij}=0$ or 1 which describes power inequations that will be used for checking, where n=number of linear inequations for this power supply unit, and m=number of voltage channels in the system. The information stored in power supply EEPROM also includes a vector PV of n values which defines the verification values for each of the above power inequations.

A power supply holding that above information allows software code to manage the power budget, and to decide if it should give power or not to connected devices as a function of their power consumption on each voltage channel. Basically, each time a device is added, a vector P composed of m variables $P_{vj}$ which represent each of the sum of power consumed by the already powered on devices plus the added device on voltage channel j, must be used against matrix P to check that the equations:

$$\alpha_{ij}.PV1+\alpha_{ij}.P_{V2}+ \ldots +\alpha_{im}.P_{Vm}=PV_i$$

are satisfied for each i. An additional verification is needed to see if for each voltage channels j where $P_{vj}\neq 0$ and $VS_j \neq 0$.

Before starting the method according to the invention, an initial step consists in building a matrix PEC, the coefficients of which will be named $\beta_{ij}$ that is the composition of the PE matrices of all the power supplies present in the system. When a same power inequation is used for several power supplies, this inequation is used only one time in the PEC matrix.

Likewise, a vector PVC is built by composing the vectors PV of all the power supplies. When a component $PV_i$ is different for several identical power inequations from the PE matrices, the minimum value is kept for the single inequation kept.

A vector p is built by adding the vectors VS of all the power supplies. This means that the components of vector p represent the number of power supplies supplying each voltage. Subsequently, a vector PC is built by adding the vector P corresponding to all the power supplies and dividing each component value by the associated component of p as shown below.

$$PC=\Sigma P/p$$

In summary the initial step consists in initializing PEC to null matrix and PVC to null vector (vertical dimension =0), initializing the vector p to vector 0, and executing the following algorithm for each present power supply.
Algorithm 1:
  (i) Get the VS, PE and PV information for a power supply from its corresponding EEPROM on the I2C Bus.
  (ii) Use VS from the power supply to update the vector p. If this power supply supplies a voltage channel, increment by 1 the corresponding number in p.
  (iii) Use PE and PV from this power supply to update PEC and PVC.

If an equation in PE is not in PEC, add it to PEC increasing its vertical dimension by one (1) and add the corresponding $PV_i$ to PVC at the same vertical position. On the other hand, if an equation in PE is already in PEC but its corresponding $PV_i$ is lower than the value for this equation in PVC, replace the value in PVC by this $Pv_i$.

Such an algorithm is as follows when written in pseudo-language form:

```
/* Get VS, PE and PV from power supply EEPROM on I2C bus */
. . code is implementation dependent . .
/* Update number of power supplies supplying each voltage
channel */ for each j in [1. .m], do
   if (Vs_j != 0) then set p_j = p_j + 1
/* Add new equations to PEC and PVC, or update PVC if
needed */ for each i in [1. .n], n being number of rows of
PE, do
   set already_there = FALSE
   for each i' in [1. .n_PEC], do
      if ((α_i1, α_i2, . . . , α_im ) =
(β_i'1, β_i'2, . . . , β_i'm)) then
         set already_there = TRUE
         end loop for each i'
   if (!already_there) then     /* Add new equation */
      set (β_nPEC1, β_nPEC2, . . . , β_nPECm) = (α_i1, α_i2, . . . , α_im)
      set PVC_nPEC = PV_i
      set n_PEC = n_PEC + 1
   else                           /* Update PVC_i'*/
      if (PV_i<PVC_i') then
         set PVC_i' = PV_i
```

An alternative embodiment of the invention consists in using a power redundancy mode. In such a mode, it is assumed that a power supply k has failed and the remaining power supplies have to supply all voltages being used and the required power for each of them. In such a case, it is possible to determine matrix $PEC^k$, and vectors $PVC^k$ and $p^k$ corresponding to PEC, PVC and p when power supply k has failed.

Accordingly, in power redundancy mode, the initial step consists in initializing $PEC^k$, $PVC^k$ and $p^k$ for k going from 1 to K (number of present power supplies) and executing the above algorithm in a system where power supply k is missing.

Figure 2:
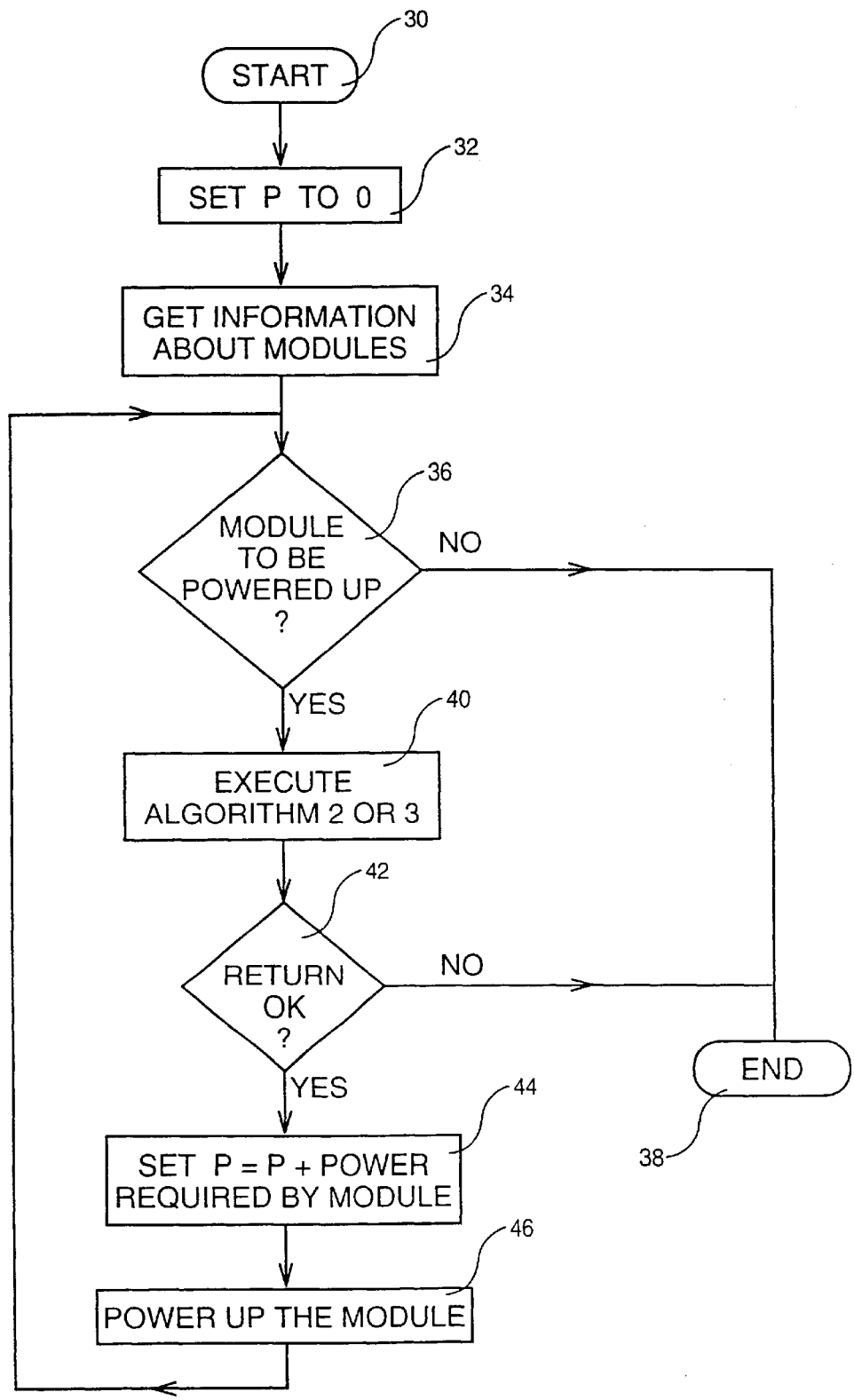
FIG. 2 is an exemplary flow chart, according to the principles of the present invention, representing the sequential steps used to check whether the power consumption devices of the system illustrated in FIG. 1 can be powered up.

The method used to determine whether the power consumption devices can be powered up is now described in reference to the flow chart illustrated in FIG. 2. The method starts (step 30) either automatically on a periodical basis or when a new module has been added to the system. Next, vector P represents the power consumed by the modules is set to 0 (step 32). The information about modules (voltages being used, power consumed) is obtained either from an EEPROM in the module or from a software table (step 34). Next, it is checked whether there is a module to be powered up (step 36). If there is a module to be powered up, algorithm 2 or algorithm 3 (described below) is executed (step 40). The purpose of algorithm 2 is to verify that there is at least one power supply supplying each needed voltage and that a given power consumption load can be supported by the power supplies present in the system. Accordingly, the function of algorithm 2 consists in performing the following function detailed below.

Algorithm 2:
  (i) Checking that for each value in P ("vector of needed power"), the corresponding value in p ("number of power supplies supplying each voltage channel") is not 0. If it is 0, then the needed power cannot be supported, return KO.
  (ii) Building PC vector of needed power per power supply where each term equals the corresponding term in P divided by the corresponding term in p.
  (iii) Verifying that $PEC.PC \leq PVC$ An exemplary pseudo-code for implementing algorithm 2 is as follows:

```
/* Build PC and check that needed voltage channels are
supplied */ for each j in [1. .m], do
   if (P_j = 0) then
      if (p_j != 0) then return check_KO
      else set PC_j = 0
   else set PC_j = P_j/P_j
/* Verify the checking equations */
for each i in [1. .n_PEC], being the number of rows of PEC, do
   if (β_i1PC_1 + _i2PC_2 + . . . + _imPC_m > PVC_i) then return
check_KO
   return check_OK
```

If the system is in power redundancy mode, algorithm 3 is to be used. The function of algorithm 3 consists in doing the following functions detailed below.

Algorithm 3:
  (i) For each k going from 1 to K, using algorithm 2 on $PEC^k$, $PVC^k$ and $P^k$, doing as if power supply k was not here for the calculation of PC.
  (ii) If at least one returns KO, return KO, else (i.e. if every one returns OK) return OK.

An exemplary pseudo-code for implementing algorithm 3 is follows:

```
/* Apply algorithm 2 for each tuple (PEC^k, PVC^k, p^k ) */
for each k in [1. .K], do
   if (algorithm_2 (PEC^k, PVC^k, P^k ) = check_KO) then
      return check_KO
   return check_OK
```

The following step is to check whether algorithm 2 or algorithm 3 has returned ok (step 42). If not, the process is ended (step 38). If return OK, P is set to the current value to which is added the value of the power required by module to be powered up (step 44). Finally, the module is powered up (step 46) before returning to checking whether there is still another module to be powered up.

Figure 3A:
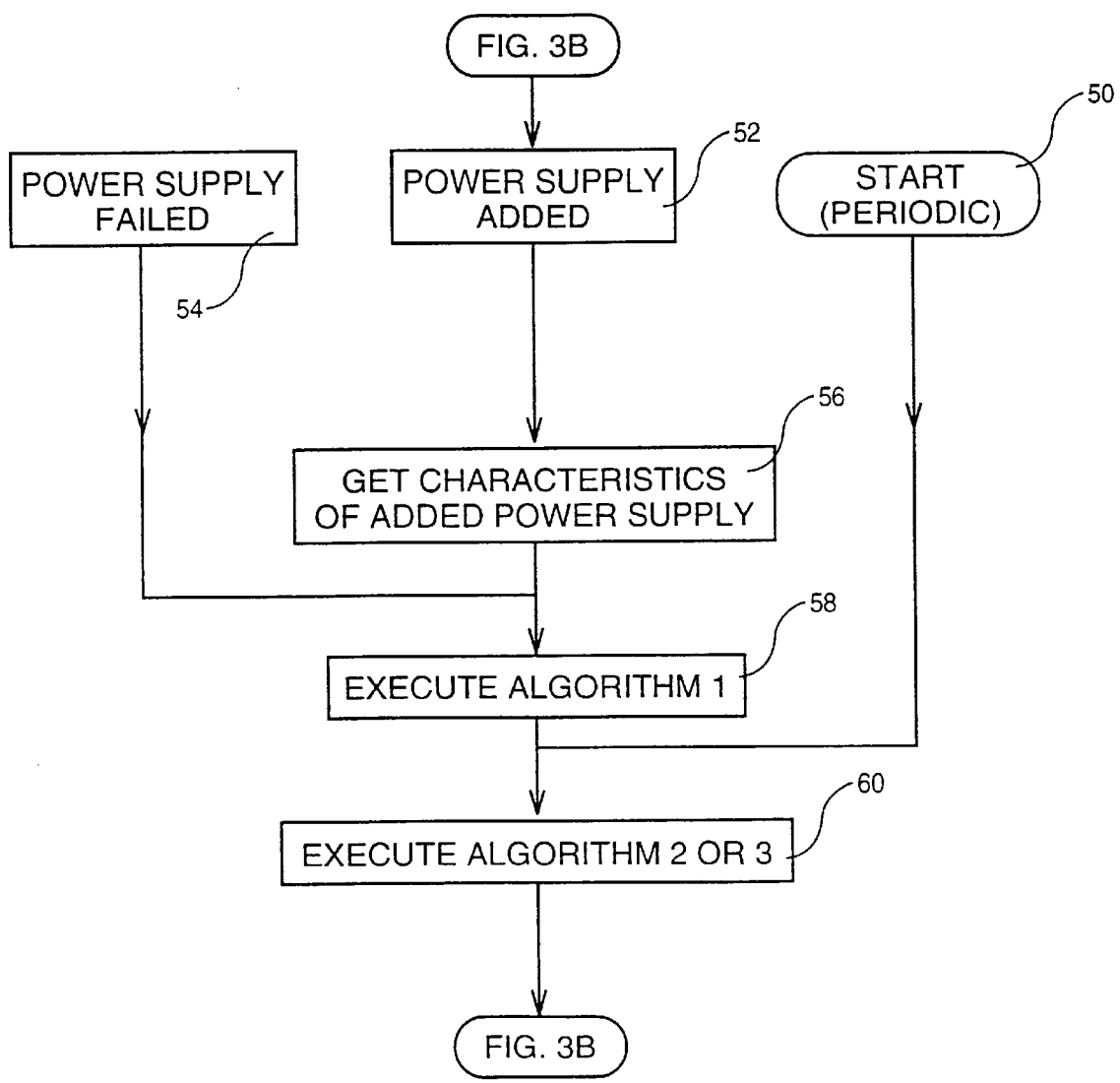
FIG. 3 is an exemplary flow chart representing the steps of the method used to manage the power supplies in the system either on a periodical basis or each time a power supply has failed or is added.

The method of managing the power supplies is now described with reference to FIG. 3A and FIG. 3B. First, it should be noted that the processing is started either automatically on a periodic basis (step 50), because a power supply has been added to the system (step 52) or because a power supply has failed (step 54). It also should be noted that starting the process periodically can be necessary insofar as the characteristics of the power consumption devices may change with time.

When the process is started because there is a new power supply, it is necessary to get characteristics of the added power supply from the EEPROM included therein. After getting this information, or if the process is started because of power supply has failed, algorithm 1 described previously is executed (step 58) in order to initialize the parameters to be used in the following steps.

Next, when algorithm 1 has been executed or because the process has been automatically started (in such a case, algorithm 1 has already been executed and the parameters are already initialized), algorithm 2 or algorithm 3 (when in power redundancy mode) is executed (step 60).

The following step checks whether algorithm 2 or algorithm 3 has returned OK (step 62). If not, a test is made to check whether the system is in power redundancy mode (step 64). If it is the case, a command of "exit power redundancy mode" is performed (step 66) and algorithm 2 is executed (step 68). This way, it is possible that algorithm 3 does not return OK whereas algorithm 2 requiring less severe conditions than algorithm 3, returns OK after the power redundancy mode has been abandoned. If the execution of algorithm 2 returns OK (step 70) this means that the present power supplies are sufficient to provide power to the modules, and that a new module may be powered up (step 72). Note that the process goes directly to the step of powering up modules when the first execution of algorithm 2 returns OK (step 62).

When it is not possible to supply enough power with the present power supplies, the system being in power redundancy mode or not, it is necessary to power down at least one of the modules (step 74).

At this point, it is necessary to start again the process (FIG. 3A) after having added a new power supply to the system. The characteristics of this new supply can be determined by executing the following algorithm 4 detailed below. (step 76).

Algorithm 4:
  (i) Calculate PVdiff=PVC−PEC.PC. Now, look at the equations in PEC corresponding to the negative terms of PVdiff, and only at them. List all the voltage channels which are used by this equations (i.e. whose $\beta i,j=1$).
  (ii) Calculate a VSreq. Where each term in VSreq equals 1 if corresponding voltage is in the list built in the preceding step, else it is equal to 0.
  (iii) Calculate a new p' where p'=p+VSreq.
  (iv) Calculate a new PC', where each term equals the corresponding term in P divided by the corresponding term in p'.

If PEC.PC'≦PVC, then a new power supply can be added to solve the problem. This new power supply would have as minimum characteristics the following: VSreq, PEreq defined by $\alpha_{ij}=0$ if i≠j, else $\alpha_{ij}=1$ if VSreq$_i$=1, else $\alpha_{ij}=0$, and PVreq defined by PVreq$_i$=0 if Vsreq$_i$=0, else Pvreq$_i$=PC$_i$. In other words, this new power supply should supply at least the voltage channels where there is a 1 in VSreq, with at least the corresponding power in PC'.

Note that, after powering up the modules (step 72), it is able to execute algorithm 3 if the system is not in power redundancy mode and to enter this mode if the execution of algorithm 3 returns OK (step 78).

Detailed Example

The system being used as an example includes 2 power supplies providing the 4 following voltages:
  V1=+3,3 volts
  V2=+5 volts
  V3=−48 volts
  V4=+12 volts Power supply 1 provides voltages V1, V2, V3 and V4 and is. characterized by the following inequations:

$$P_{V1}+P_{V2}+P_{V3}+P_{V4} \leq 590 \text{ W}$$

$$P_{V1} \leq 444 \text{ W}$$
$$P_{V2} \leq 306 \text{ W}$$
$$P_{V3} \leq 144 \text{ W}$$
$$P_{V4} \leq 84 \text{ W}$$

$$\text{and so thus } VS = (1,\ 1,\ 1,\ 1),\ PE = \begin{pmatrix} 1 & 1 & 1 & 1 \\ 1 & 0 & 0 & 0 \\ 0 & 1 & 0 & 0 \\ 0 & 0 & 1 & 0 \\ 0 & 0 & 0 & 1 \end{pmatrix},$$

$$\text{and } PV = \begin{pmatrix} 590 \\ 444 \\ 306 \\ 144 \\ 84 \end{pmatrix}.$$

Power supply 2 provides voltages V1, V2 and V4 and is characterized by the following inequations:

$$P_{V1}+P_{V2} \leq 450 \text{ W}$$

$$P_{V1} \leq 444 \text{ W}$$
$$P_{V2} \leq 280 \text{ W}$$
$$P_{V4} \leq 120 \text{ W}$$

$$\text{thus } VS = (1,\ 1,\ 0,\ 1),\ PE = \begin{pmatrix} 1 & 1 & 0 & 0 \\ 1 & 0 & 0 & 0 \\ 0 & 1 & 0 & 0 \\ 0 & 0 & 0 & 1 \end{pmatrix},$$

$$\text{and } PV = \begin{pmatrix} 446 \\ 444 \\ 280 \\ 120 \end{pmatrix}.$$

After power on of the system, PEC, PVC and p will be calculated by algorithm 1 as follows:

$$PEC = \begin{pmatrix} 1 & 1 & 1 & 1 \\ 1 & 0 & 0 & 0 \\ 0 & 1 & 0 & 0 \\ 0 & 0 & 1 & 0 \\ 0 & 0 & 0 & 1 \\ 1 & 1 & 0 & 0 \end{pmatrix},\ PVC = \begin{pmatrix} 590 \\ 444 \\ 280 \\ 144 \\ 84 \\ 446 \end{pmatrix},$$

and p=(2, 2, 1, 2).

For redundancy mode, since there are 2 power supplies, there will be 2 cases of failure, and then 2 tuples:

$$PEC^1 = \begin{pmatrix} 1 & 1 & 0 & 0 \\ 1 & 0 & 0 & 0 \\ 0 & 1 & 0 & 0 \\ 0 & 0 & 0 & 1 \end{pmatrix}, \quad PVC^1 = \begin{pmatrix} 446 \\ 444 \\ 280 \\ 120 \end{pmatrix},$$

and $p^1=(1, 1, 0, 1)$ for the case where power supply 1 fails, $$\text{and } PEC^2 = \begin{pmatrix} 1 & 1 & 1 & 1 \\ 1 & 0 & 0 & 0 \\ 0 & 1 & 0 & 0 \\ 0 & 0 & 1 & 0 \\ 0 & 0 & 0 & 1 \end{pmatrix}, \quad PVC^2 = \begin{pmatrix} 590 \\ 444 \\ 306 \\ 144 \\ 84 \end{pmatrix}, \text{ and}$$

$p^2=(1, 1, 1, 1)$ for the case where power supply 2 fails.

Let's assume that the total power required by the Control Point and the consumption devices is $$P = \begin{pmatrix} 200 \\ 150 \\ 80 \\ 120 \end{pmatrix}.$$

When algorithm 2 is executed to check which consumption devices can be powered up, it will calculate $$PC = \begin{pmatrix} 100 \\ 75 \\ 80 \\ 60 \end{pmatrix}$$

for the total load, using p.

$$\text{Since } PEC \cdot PC = \begin{pmatrix} 315 \\ 100 \\ 75 \\ 80 \\ 60 \\ 175 \end{pmatrix} \leq PVC = \begin{pmatrix} 590 \\ 444 \\ 280 \\ 144 \\ 84 \\ 446 \end{pmatrix},$$

all the consumption devices will be powered up.

Figure 3B:
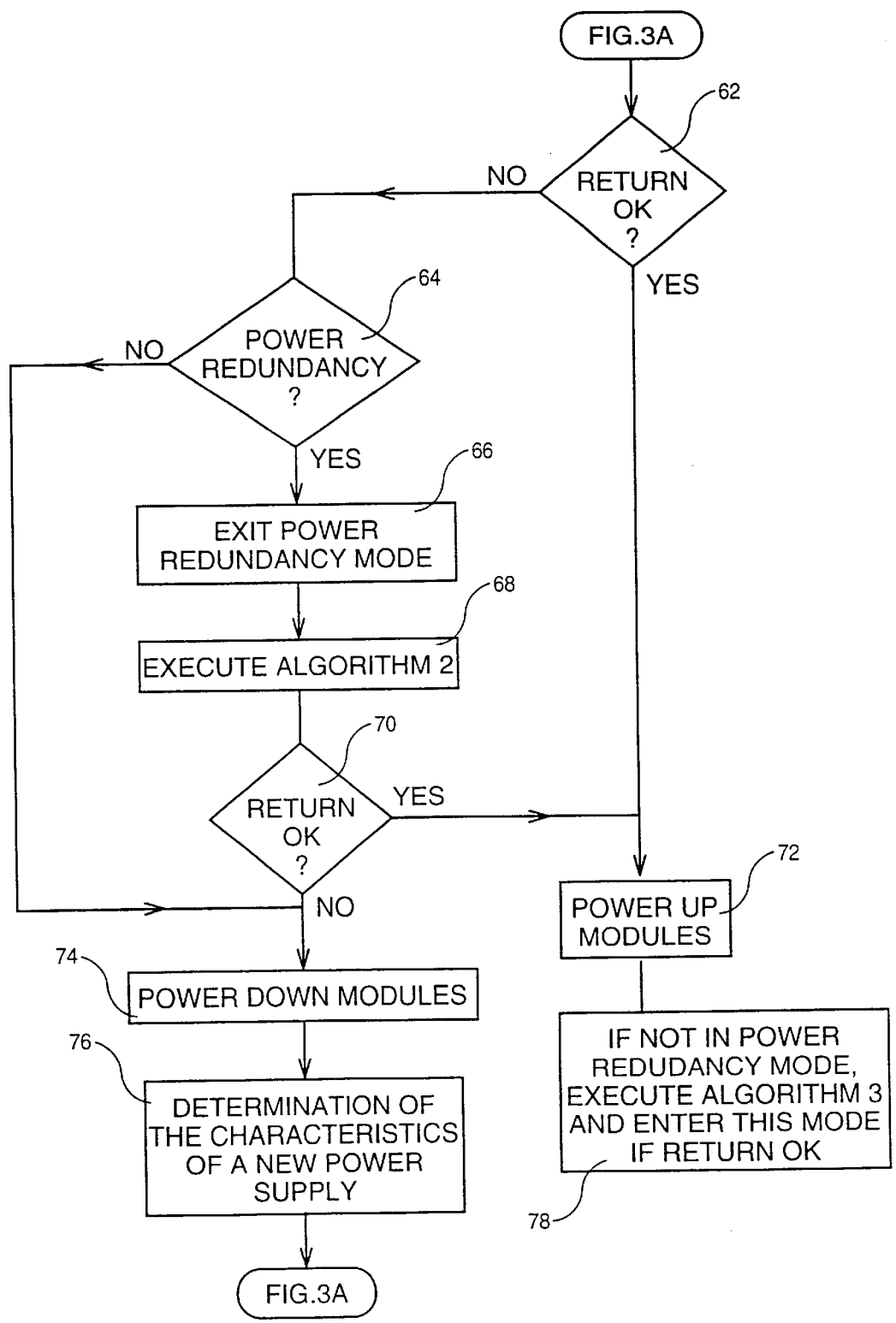

As discussed previously, algorithm 3 is then executed (step 76 of FIG. 3B). However, in the present case, power supply 2 alone does not supply voltage V3 and therefore the execution of algorithm 3 returns KO. Consequently, the power redundancy mode will not be set.

The following two cases are given to illustrate the different possibilities of the invention. In the first case, the addition of a new module results in the addition of a power supply identical to a power supply already in the system whereas in the second case, the characteristics of a new power supply to be introduced are determined as a function of a new module added to the system.

1. Case 1

It is assumed that the new consumption device requires $$P = \begin{pmatrix} 10 \\ 18 \\ 50 \\ 54 \end{pmatrix}$$

and has a power priority superior to any other device already powered up in the system. The new total P will be $$\begin{pmatrix} 210 \\ 168 \\ 130 \\ 174 \end{pmatrix},$$

and when executing algorithm 2, the new PC will be $$\begin{pmatrix} 105 \\ 84 \\ 130 \\ 87 \end{pmatrix}$$

which yields $$PEC \cdot PC = \begin{pmatrix} 416 \\ 105 \\ 84 \\ 130 \\ 87 \\ 189 \end{pmatrix},$$

and since this is not $\leq$ PVC, the consumption device will not be powered up and will remain in the list of devices to be powered up.

Let us assume that the operator decides to add a new power supply 3, identical to power supply 1. Algorithm 1 is re-executed, and this leads to the same PEC and PVC than before (no new equation, no new limit), but p will be updated to (3, 3, 2, 3). It will also calculate $$PEC^1 = PEC^3 = \begin{pmatrix} 1 & 1 & 1 & 1 \\ 1 & 0 & 0 & 0 \\ 0 & 1 & 0 & 0 \\ 0 & 0 & 1 & 0 \\ 0 & 0 & 0 & 1 \\ 1 & 1 & 0 & 0 \end{pmatrix},$$

$$PVC^1 = PVC^3 = \begin{pmatrix} 590 \\ 444 \\ 280 \\ 144 \\ 84 \\ 446 \end{pmatrix},$$

and $p^1=p^3=(2, 2, 1, 2)$ for the case where power supply 1 or power supply 3 fails, and $$PEC^2 = \begin{pmatrix} 1 & 1 & 1 & 1 \\ 1 & 0 & 0 & 0 \\ 0 & 1 & 0 & 0 \\ 0 & 0 & 1 & 0 \\ 0 & 0 & 0 & 1 \end{pmatrix}, PVC^2 = \begin{pmatrix} 590 \\ 444 \\ 306 \\ 144 \\ 84 \end{pmatrix},$$

and $p^2=(2, 2, 2, 2)$ for the case where power supply 2 fails.

Next, executing algorithm 2, we calculate $$PC = \begin{pmatrix} 70 \\ 56 \\ 65 \\ 58 \end{pmatrix}$$

for the total power consumed plus the power required by the added device still waiting for power.

Since $$PEC \cdot PC = \begin{pmatrix} 249 \\ 70 \\ 56 \\ 65 \\ 58 \\ 126 \end{pmatrix} \leq PVC,$$

this device is now powered up. However, since in algorithm 3, the case 2 (where power supply 2 fails) does not pass the check, the system cannot be in power redundancy mode.

2. Case 2

It is assumed that the new power consumption device requires $$P = \begin{pmatrix} 274 \\ 270 \\ 0 \\ 0 \end{pmatrix}.$$

The new total P will be $$\begin{pmatrix} 474 \\ 420 \\ 80 \\ 120 \end{pmatrix},$$

and since $p=(2, 2, 1, 2)$, $$PC = \begin{pmatrix} 237 \\ 210 \\ 80 \\ 60 \end{pmatrix}.$$

Then $$PEC \cdot PC = \begin{pmatrix} 587 \\ 237 \\ 210 \\ 80 \\ 60 \\ 447 \end{pmatrix},$$

which will not be $$\leq PVC = \begin{pmatrix} 590 \\ 444 \\ 280 \\ 144 \\ 84 \\ 446 \end{pmatrix}.$$

If algorithm 4 is applied, $$PVdiff = \begin{pmatrix} 3 \\ 207 \\ 70 \\ 64 \\ 24 \\ -1 \end{pmatrix},$$

and then Vsreq=(1, 1, 0, 0), since the only line in PEC where the result is negative is the last one. The new p' is then (3, 3, 1, 2), and $$PC' = \begin{pmatrix} 158 \\ 140 \\ 80 \\ 60 \end{pmatrix}.$$

Therefore, $$PEC \cdot PC' = \begin{pmatrix} 438 \\ 158 \\ 140 \\ 80 \\ 60 \\ 298 \end{pmatrix} \leq PVC,$$

so the new power supply to add should have $$PEreq = \begin{pmatrix} 1 & 0 & 0 & 0 \\ 0 & 1 & 0 & 0 \end{pmatrix}$$

and $$PVreq = \begin{pmatrix} 158 \\ 140 \end{pmatrix}$$

as minimum characteristics (the lines with all 0's have been removed from PEC since they are of no use).

What is claimed is:

1. A method for determining whether power consumption devices can be powered up in a power consuming system having a first plurality of power consumption devices to be powered up by one or several voltages from a set of voltages V1, V2 . . . Vm, a second plurality of power supplies providing said set of voltages, wherein each power supply providing at least one of said set of voltages and a control point for controlling the power supplied to said first plurality of power consumption devices, said method comprising the steps of:

(a) determining a first set of linear inequations linking each variable $P_{v1}, P_{v2} \ldots P_{vm}$ representing the power being consumed for each of said set of voltages, or combinations of several of said variables, to predetermined power limits (PVC);

(b) determining a real power value (P) requested for each voltage in order to power up each of said first plurality of power consumption devices;

(c) dividing each of said real power value by the number of power supplies (p) providing power for the associated voltage in order to determine the components of a power consumption vector (PC) for each of said power supply;

(d) replacing said variables $P_{v1}, P_{v2} \ldots P_{vm}$ in said set of linear inequations with said corresponding components of said power consumption vector for each of said power supply to obtain a requested power value for each of said linear inequations;

(e) comparing said requested power values to said predetermined power limits; and (f) powering up each of said first plurality of power consumption devices in response to said requested power values being less than said predetermined power limits.

2. The method as recited in claim 1, wherein said step of determining a first set of linear inequations includes the steps of:

(a1) determining a linear inequation for each of said set of voltages linking each of said variables $P_{v1}, P_{v2} \ldots P_{vm}$ to predetermined power limits;

(a2) building said set of linear inequations by gathering all of said linear inequations determined for each of said plurality of power supplies, retaining only one linear inequation when there are several identical linear inequations; and (a3) selecting, in response to encountering several identical linear inequations, the lowest predetermined power limit from among the predetermined power limits associated with said identical linear inequations, said lowest predetermined power limit being associated with said retained linear inequation.

3. The method as recited in claim 1, further comprising the steps of:

determining for each of said plurality of power supplies a second set of linear inequations linking each of said variables $P_{v1}, P_{v2} \ldots P_{vm}$, said second set of linear inequations representing, for each of said voltages, the power that can be consumed from said power supply;

determining, for each of said plurality of power supplies, a first vector (VS) having components equal to 0 or 1 that defines which voltages from said set of voltages are supplied by said power supply; and determining, for each of said linear inequations, a second vector (PV) that defines verification values for each one of said linear inequations.

4. The method as recited in claim 1, wherein said power consuming system is in a power redundancy mode.

5. The method as recited in claim 1, wherein said method being executed automatically on a periodic basis.

6. The method as recited in claim 1, wherein said method is executed when a new module is added to said power consuming system.

7. A power managing system for use in a power consuming system having a first plurality of power consumption devices to be powered up by one or several voltages from a set of voltages V1, V2 . . . Vm, a second plurality of power supplies providing said set of voltages, wherein each power supply providing at least one of said set of voltages and a control point for controlling the power supplied to said first plurality of power consumption devices, said power managing system comprising:

means for determining whether each said first plurality of power consumption devices can be powered up, including:

(a) means for determining a first set of linear inequations linking each variable $P_{v1}, P_{v2} \ldots P_{vm}$ representing the power being consumed for each of said set of voltages, or combinations of several of said variables, to predetermined power limits (PVC);

(b) means for determining a real power value (P) requested for each voltage in order to power up each of said first plurality of power consumption devices;

(c) means for dividing each of said real power value by the number of power supplies (p) providing power for the associated voltage in order to determine the components of a power consumption vector (PC) for each of said power supply;

(d) means for replacing said variables $P_{v1}, P_{v2} \ldots P_{vm}$ in said set of linear inequations with said corresponding components of said power consumption vector for each of said power supply to obtain a requested power value for each of said linear inequations;

(e) means for comparing said requested power values to said predetermined power limits; and (f) means for powering up each of said first plurality of power consumption device in response to said requested power values being less than said predetermined power limits.

8. The power managing system as recited in claim 7, wherein said means for determining a first set of linear inequations includes:

(a1) means for determining a linear inequation for each of said set of voltages linking each of said variables $P_{v1}, P_{v2} \ldots P_{vm}$ to predetermined power limits; and (a2) means for building said set of linear inequations by gathering all of said linear inequations determined for each of said plurality of power supplies, retaining only one linear inequation when there are several identical linear inequations; and (a3) means for selecting, in response to encountering several identical linear inequations, the lowest predetermined power limit from among the predetermined power limits associated with said identical linear inequations, said lowest predetermined power limit being associated with said retained linear inequation.

9. The power managing system as recited in claim 7, wherein said means for determining whether said first plurality of power consumption devices can be powered up further comprising:

means for determining for each of said plurality of power supplies a second set of linear inequations linking each of said variables $P_{v1}, P_{v2} \ldots P_{vm}$, said second set of linear inequations representing, for each of said voltages, the power that can be consumed from said power supply;

means for determining, for each of said plurality of power supplies, a first vector (VS) having components equal to 0 or 1 that defines which voltages from said set of voltages are supplied by said power supply; and means for determining, for each of said linear inequations, a second vector (PV) that defines verification values for each one of said linear inequations.

10. The power managing system as recited in claim 7, wherein said power consuming system is in a power redundancy mode.

11. The power managing system as recited in claim 7, wherein said method being executed automatically on a periodic basis.

12. The power managing system as recited in claim 7, wherein said method is executed when a new module is added to said power consuming system.

13. A computer program product, Comprising:

a computer-readable medium having stored thereon computer executable instructions for implementing a method for determining whether power consumption devices can be powered up in a power consuming system having a first plurality of power consumption devices to be powered up by one or several voltages from a set of voltages V1, V2 . . . Vm, a second plurality of power supplies providing said set of voltages, wherein each power supply providing at least one of said set of voltages and a control point for controlling the power supplied to said first plurality of power consumption devices, said computer executable instructions when executed, perform the steps of:

(a) determining a first set of linear inequations linking each variable $P_{v1}, P_{v2} \ldots P_{vm}$ representing the power being consumed for each of said set of voltages, or combinations of several of said variables, to predetermined power limits (PVC);

(b) determining a real power value (P) requested for each voltage in order to power up each of said first plurality of power consumption devices;

(c) dividing each of said real power value by the number of power supplies (p) providing power for the associated voltage in order to determine the components of a power consumption vector (PC) for each of said power supply;

(d) replacing said variables $P_{v1}, P_{v2} \ldots P_{vm}$ in said set of linear inequations with said corresponding components of said power consumption vector for each of said power supply to obtain a requested power value for each of said linear inequations;

(e) comparing said requested power values to said predetermined power limits; and (f) powering up each of said first plurality of power consumption devices in response to said requested power values being less than said predetermined power limits.

* * * * *